H. M. SUTTON AND W. L. AND E. G. STEELE.
PROCESS OF AND APPARATUS FOR SEPARATING AND GRADING MATERIAL.
APPLICATION FILED MAY 19, 1915.

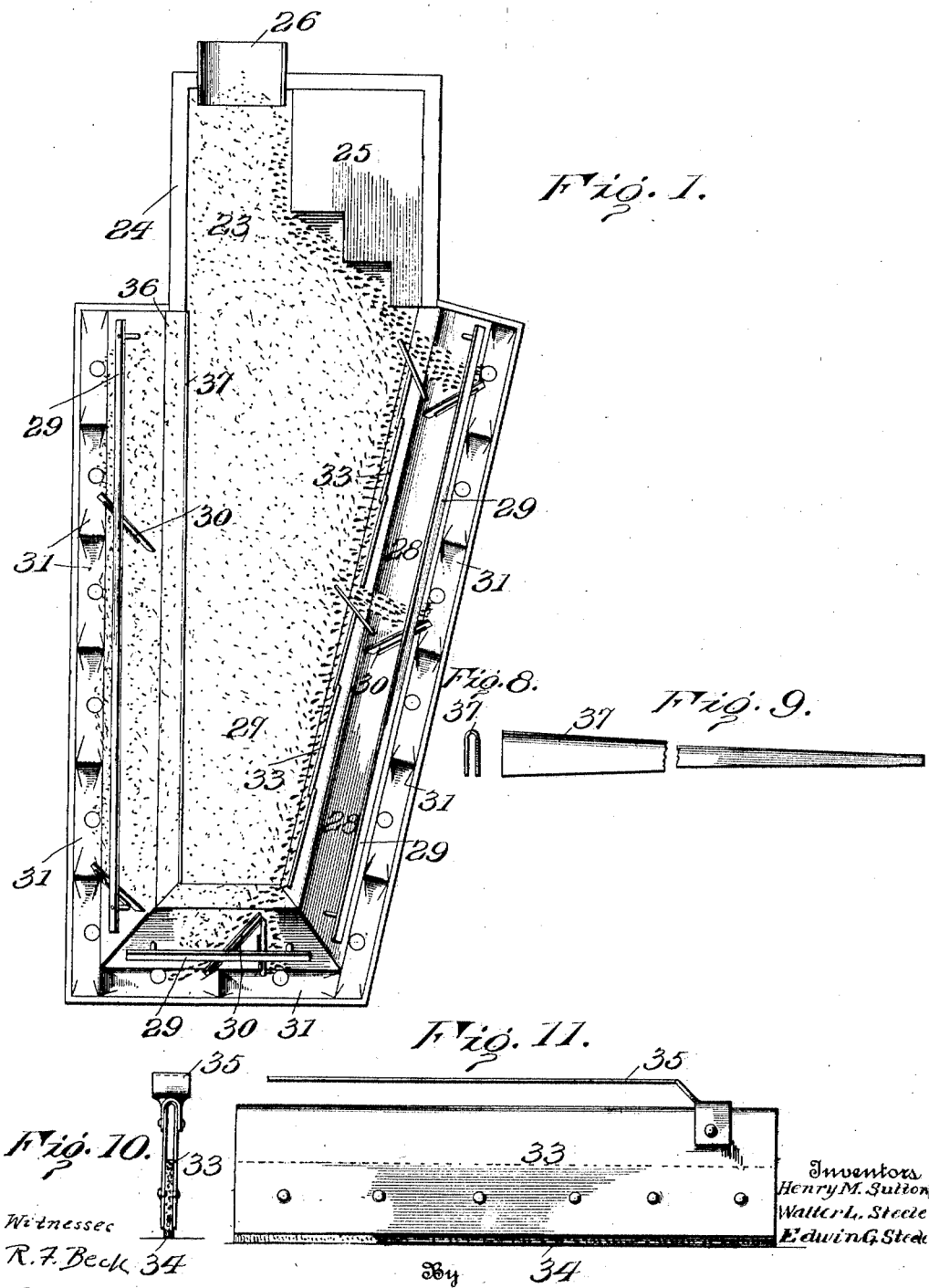

1,315,881.

Patented Sept. 9, 1919.
6 SHEETS—SHEET 2.

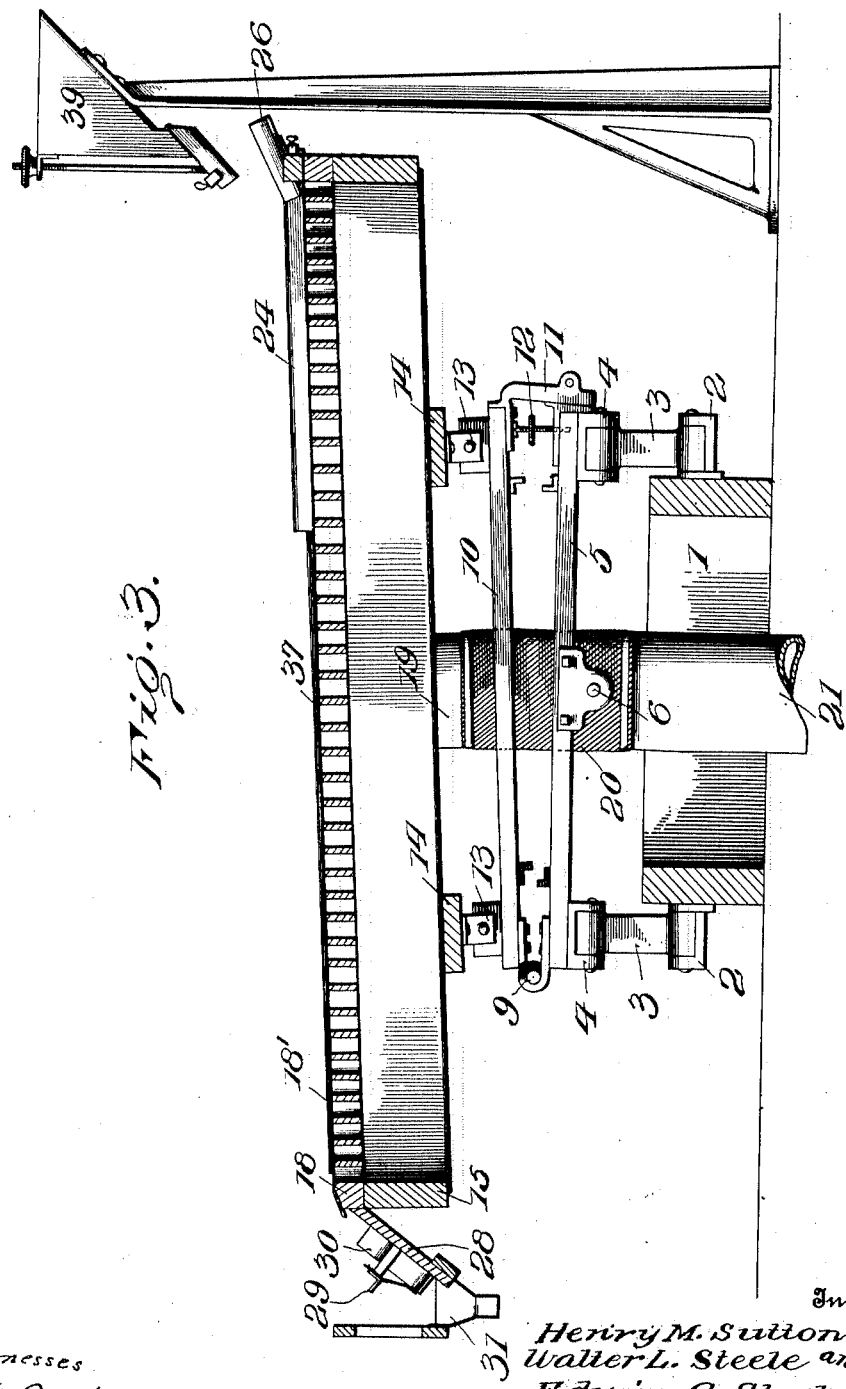

H. M. SUTTON AND W. L. AND E. G. STEELE.
PROCESS OF AND APPARATUS FOR SEPARATING AND GRADING MATERIAL.
APPLICATION FILED MAY 19, 1915.
1,315,881. Patented Sept. 9, 1919.
6 SHEETS—SHEET 4.
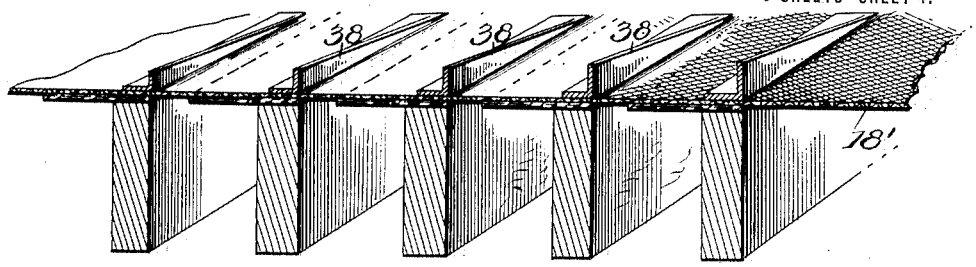
Fig. 14.
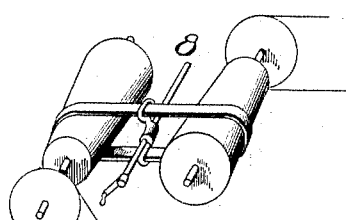
Fig. 4.
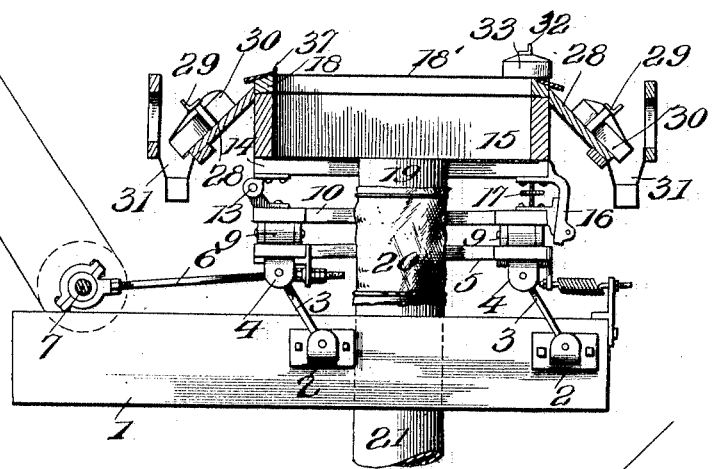
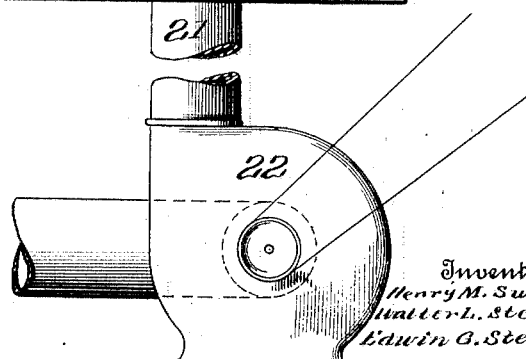
Witnesses
R. F. Beck
Inventor
Henry M. Sutton
Walter L. Steele
Edwin G. Steele
By E. B. Hocking
Attorney

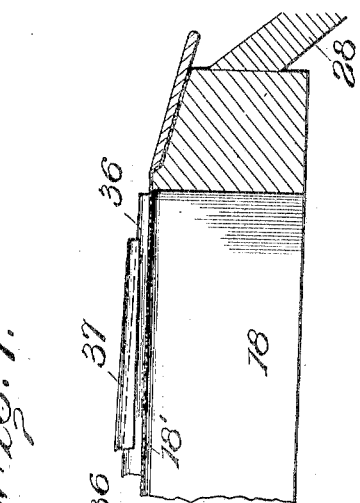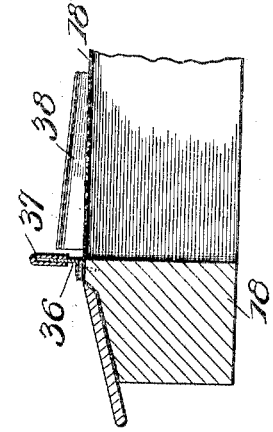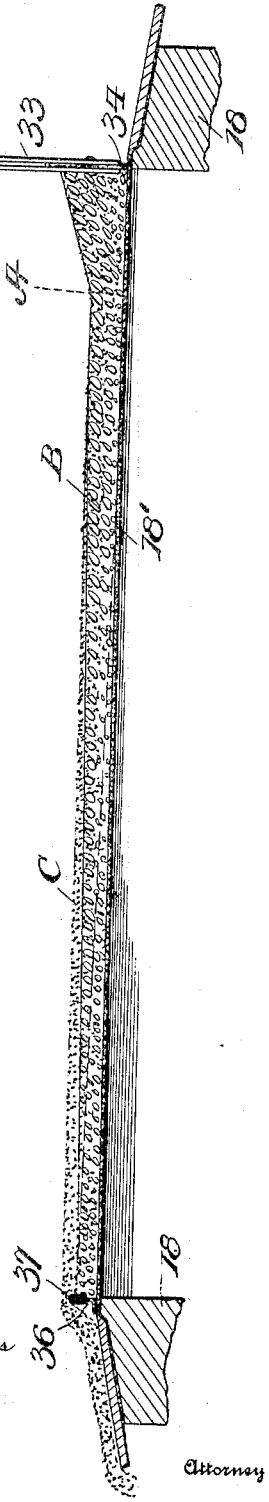

H. M. SUTTON AND W. L. AND E. G. STEELE.
PROCESS OF AND APPARATUS FOR SEPARATING AND GRADING MATERIAL.
APPLICATION FILED MAY 19, 1915.
1,315,881.
Patented Sept. 9, 1919.
6 SHEETS—SHEET 6.
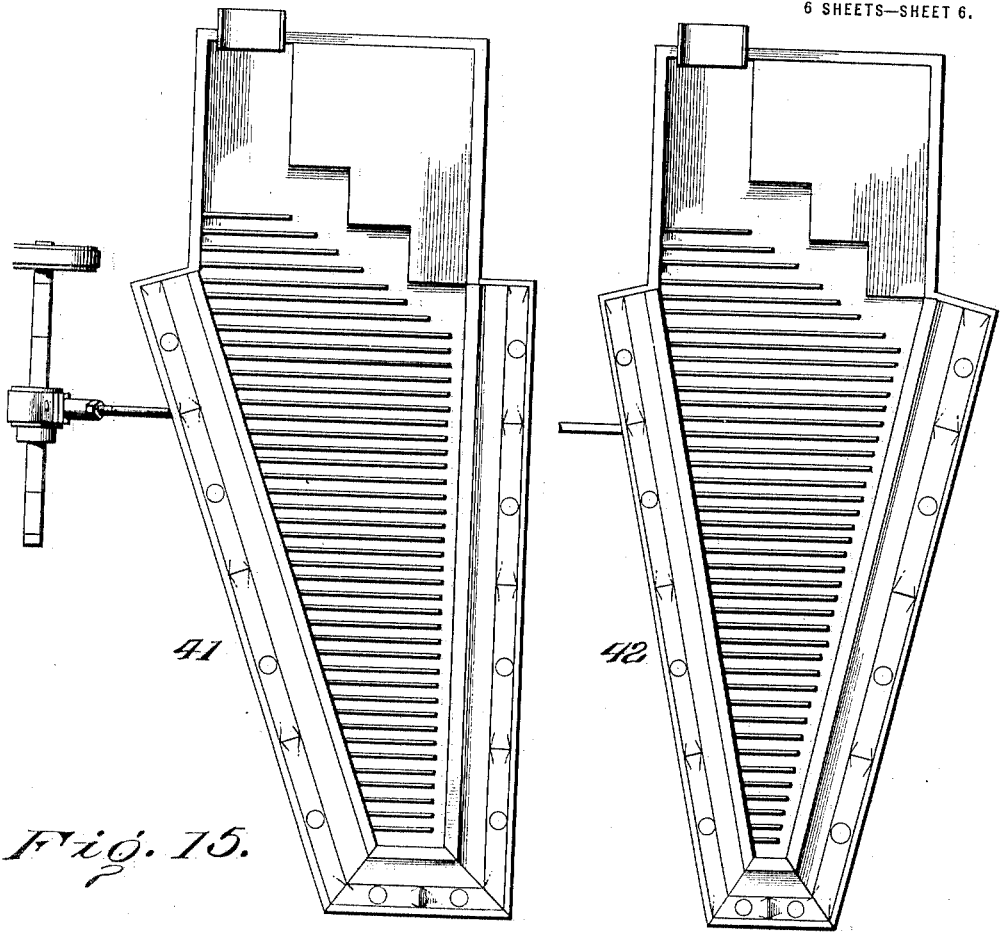
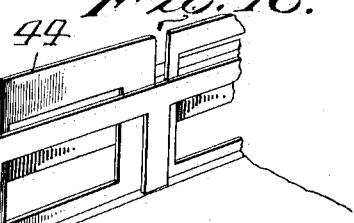

UNITED STATES PATENT OFFICE.

HENRY M. SUTTON, WALTER L. STEELE, AND EDWIN G. STEELE, OF DALLAS, TEXAS.

PROCESS OF AND APPARATUS FOR SEPARATING AND GRADING MATERIAL.

1,315,881.  Specification of Letters Patent.  Patented Sept. 9, 1919.

Application filed May 19, 1915. Serial No. 29,137.

*To all whom it may concern:*

Be it known that we, HENRY M. SUTTON, WALTER L. STEELE, and EDWIN G. STEELE, citizens of the United States, residing at Dallas, in the county of Dallas and State of Texas, have invented certain new and useful Improvements in Processes of and Apparatus for Separating and Grading Material, of which the following is a specification, reference being had therein to the accompanying drawing.

This invention relates to a process of and an apparatus for separating and grading materials and is an improvement upon our Patent #1,073,644, issued September 23, 1913, for a "Separating table and process of separation"; the object of this invention being to improve the general construction of separating table by providing a table with an obstruction arranged on the opposite side from the banking bar thereof in such a manner that the stratum of heavy particles is subjected to a rear impact or pressure so as to aid the heavy particles to move by the propelling action of the table against the force of gravity, while the stratum of lighter particles, which overlies the stratum of heavy particles, is discharged from the opposite side of the table by the action of gravity, thereby producing a separating table in which the products are discharged from three sides thereof.

Another object of our invention is to provide the table with an obstruction which is termed a "tailing riffle" arranged on the tailings-discharge-side of the table and extending at right angles to the retarding riffles in order to produce a rear impact or pressure on the stratum of heavy particles arranged upon the pervious surface of the table which reaches under the stratum of tailings in such a manner that the heavy particles are subjected to a pressure and at the same time, the tailings are allowed to move in a reverse direction without any back pressure.

Another object of the invention is to provide a separating table which is inclined transversely and longitudinally in order to allow the mass of material delivered thereon to move by gravity in a predetermined path, the heavier particles, which lie on the pervious surface, being projected by the movement of the table upwardly against the force of gravity so as to allow the lighter particles which are floated by the gaseous cushioning medium above the heavier particles, to move by gravity, in a reverse direction to the propelling movement.

Another object of our invention is to produce a table of minimum area without reducing the tonnage per hour of separation thereby allowing the material to be separated at a cheaper rate per ton, as the power required to drive the table and produce the necessary air pressure to float the material, is greatly reduced.

Another and further object of the invention is to provide a separating table with means for producing impacts against the stratum of heavier particles which lie on the floor of the table, through the medium of the movement of the table so as to cause the heavier particles to be propelled or advanced by the propelling movement against the banking bar in order to form an obstruction of heavy particles so as to exert a back pressure upon the mass upon the table.

Another and further object of the invention is to provide a separating table which gradually decreases in width from the feed end to the opposite end thereof, so as to reduce the area of the table in proportion to the material being removed therefrom.

Another and further object of the invention is to provide a table with an adjustable tailing riffle to form an obstruction which is arranged on the opposite side of the table from the banking bar, which gradually decreases in height from the feed end of the table to the opposite end thereof in proportion to the decrease of the zones of heavy particles and lighter particles so as to allow the tailings of lighter stratum which gradually decreases in thickness in its movement on said surface, to slush over the obstruction by the action of gravity.

Another and further object of the invention is to provide a separating table in which a stepped initial banking block is employed in order to initially bank the heavier particles, the stratification at this point of the heavier particles, being vertical to the rest of the material on the unobstructed surface, which enables the heavier particles to be trapped out by the first gate of the banking bar.

Another and further object of the invention is to provide a separating table having a surface which gradually decreases in width from the feed toward the opposite end thereof which is formed by arranging one or both of the sides diagonally, so as to subject the material to a slight wedging action in its movement by gravity in order to allow the heavier stratum lying on the pervious surface, to more readily bank itself against the banking bar and in connection with the tailing riffle which produces a rear impact or pressure, pulsations are imparted to the heavier stratum by the movement of the table so as to impart motion to the heavier particles lying adjacent the tailing riffle which communicated from particle to particle toward the banking bar until the whole stratum is pushed along under the lighter stratum against the banking bar.

Other and further objects and advantages of the invention will be hereinafter set forth and the novel features thereof defined by the appended claims.

In the drawings—

Figure 1, is a plan view of a separating table constructed in accordance with our invention, showing the movement of the material thereon;

Fig. 2, is a plan view of the table showing the retarding means on the pervious deck for retarding the movement of the material by gravity in the line of feed and as herein shown, substantially L-shaped riffles are employed which gradually decrease in height from the tailing side of the table toward the banking side thereof;

Fig. 3, is a longitudinal vertical section through the table showing the means for adjusting the table at an incline in the line of feed;

Fig. 4, is a transverse section through the table showing the means for adjusting the table at an incline in the line of propelling movement thereof, change-speed mechanism being shown in perspective for driving the table;

Fig. 5, is a transverse section of the table deck showing the material in the position which it assumes, the heavier stratum underlying the lighter stratum, the lighter stratum being termed "tailings", is shown overflowing the tailing riffle;

Fig. 6, is a detail section through a portion of the deck showing the construction of tailing riffle in position thereon;

Fig. 7, is a detail section of a portion of the deck showing the tailing riffle in elevation and partly broken away;

Fig. 8, is an end elevation of one section of a tailing riffle detached;

Fig. 9, is a side elevation of said section detached;

Fig. 10, is an end elevation of one of the gates used to form the banking bar;

Fig. 11, is a side elevation of the same;

Fig. 12, is a detail section through a portion of the deck, showing one of the gates moved into position to cut the heavier particles therefrom;

Fig. 13, is a detail section through the deck showing one of the gates arranged in position to form a portion of a banking bar;

Fig. 14, is a detail section through the pervious deck showing the retarding riffles arranged thereon;

Fig. 15, is a diagrammatic view of another form of table showing the tailing side thereof arranged diagonally in order to decrease the area of the surface; and Fig. 16, is a diagrammatic view of a table showing the tailing side and banking bar side converging to a central point in order to decrease the area of the surface thereof; and Fig. 17, is a detail view of another form of tailing riffle.

Like numerals of reference refer to like parts in the several figures of the drawings.

In carrying out our invention, we employ the usual form of base frame 1 which is provided with suitable bearings 2 in which are pivotally mounted the lower ends of toggle links 3 extending obliquely toward the head of the table in order to produce upon the table, projecting pulsations in a similar manner to that disclosed in our previously mentioned patent, so as to impart a propelling movement to the material being treated.

The free ends of the links 3 are pivotally mounted in bearings 4 carried by a frame 5 to which is connected a driving rod 6 extending from a driving mechanism 7 which is driven through the medium of a change-speed mechanism 8 constructed substantially as shown and described in our prior patent #898,020, issued September 2, 1908, in order to produce a slow advance and a quick return, the table being raised on its forward stroke on a diagonal line and receding in an inverse manner on its reverse stroke, and while we have shown the frame 5 mounted on toggle links it is, of course, understood that the main object to be accomplished is to impart movement to the table in order to propel the material and we do not wish to limit ourselves to the use of toggle links as spring supports as previously employed by us, can be used without departing from the spirit of our invention.

Pivotally connected to the frame 5 by hinge members 9 is a frame 10 having depending guide arms 11 for guiding the frame in its movement, adjusting means 12 being provided for moving the frame 10 in respect to the frame 5 for adjusting the inclination thereof.

The frame 10 carries hinge members 13 which are pivotally connected at one end to supporting beams 14 on which is mounted a casing 15 forming an air chamber, the opposite ends of said beams 14 being provided with depending guide arms 16 for guiding the beams in their vertical movements, suitable adjusting means 17 being arranged thereunder in order to change the inclination thereof as will be hereinafter more fully described.

Mounted on the casing 15 is a deck frame 18 having the usual supporting ribs over which is arranged a pervious floor 18' formed of any suitable pervious material in order to allow a uniform upward pressure of air to pass therethrough so as to form a gaseous cushioning medium for the material deposited upon said floor.

The air chamber formed by the casing 15 is provided with a nipple 19 to which is connected a flexible pipe 20 which has connected thereto, an air pipe 21 extending from a suitable source of supply, herein shown a suction blower fan 22 in order to deliver to said chamber, a uniform pressure of air and while we have shown the parts arranged in this particular manner, we do not wish to limit ourselves to the details of construction of mounting the pervious surface and fan, as the main object to be accomplished is to provide a separating table with a pervious floor having means for adjusting the inclination longitudinally and transversely together with means for projecting the material deposited upon said floor longitudinally thereof, across the movement of the material by gravity.

In the construction of table as herein shown and described, means is provided for adjusting the inclination of the table transversely and longitudinally in order to cause the material to move longitudinally on the table by gravity, and to be propelled transversely on said table up an incline against the force of gravity, so as to subject the lighter particles, which are floated above the heavier particles by the gaseous cushioning medium to the action of gravity to cause said particles to move by gravity in a direction opposite to the propelling movement of the heavy particles, which allows said lighter particles to be discharged from the opposite side of the deck from the heavier particles.

The configuration of the deck frame as herein shown is changed slightly from that illustrated in our prior patents, as the table has a greater length than width so as to increase the supporting surface over which the material passes by gravity and to decrease the surface over which the material is propelled against the force of gravity, whereby the particles are allowed to stratify quickly into zones, the heavier zone of particles lying adjacent the pervious surface and the lighter particles above the heavier particles, whereby the projecting pulsations will cause the heavier particles to be banked against the banking bar in order to exert a back pressure more quickly and the lighter particles which are floated, are allowed to move freely by gravity and be discharged so as to reduce the back pressure normally existing upon the lighter particles.

The form of table shown in the drawings, is provided with a substantially rectangular-shaped receiving end 23 free from obstructions and provided with the usual rail 24 extending around the edge thereof, said unobstructed surface having a stepped banking block 25 arranged thereon to one side of the feed shelf 26 for initially banking the particles delivered upon said unobstructed surface.

The other portion 27 of the table as herein shown gradually decreases in width from the feed end toward the opposite end and in the preferred form herein shown, the banking edge of the table is arranged at an angle to the tailing side of the table in order to decrease the area of the surface as the mass moves by gravity from the point of feed in order to decrease the supporting surface in proportion to the amount of material being discharged therefrom, as will be hereinafter more fully described.

The portion 27 of the table is provided with a delivery shelf 28 extending around the three sides thereof having the usual retaining bars 29 under which are adjustably mounted cutting fingers 30 provided with the usual retaining springs for holding said cutting fingers in adjusted position under the retaining bars, and for guiding the products delivered from the pervious surface over said delivery shelf into the product spouts 31 to enable the particles separated, to be discharged into suitable receptacles arranged thereunder.

Mounted above the pervious surface adjacent the banking side thereof, is a bar 32 spaced a proper distance from said surface and under which is arranged a sectional banking bar formed of a plurality of gates 33 which are preferably formed of sheet metal substantially inverted U-shape in cross section having pads 34 arranged between the free ends of the legs thereof which are adapted to contact with the pervious surface of the table in order to prevent the table from being injured and to produce friction to aid the springs 35 carried by said gates which contact with the bar 32 to hold the gates in adjusted position.

The gates are preferably arranged so that one gate overlaps the adjacent gate as shown in Fig. 1, in order to form a complete banking bar on a line of travel of the propelling movement of the material, each gate being independently mounted in order to allow the same to be swung outwardly so as to cut the heavier particles at the desired point from the mass of material banked against the bar thus formed, and while in our prior Patent No. 1,073,644 above referred to, a banking bar is employed having a plurality of gate-controlled openings, we have found that by forming the complete banking bar of gates, better results can be obtained, as the heavier particles can be cut at any point along the banking bar.

Extending along the opposite edge of the separating portion of the table is an obstruction for exerting a pressure upon the zone of heavy particles and is herein shown and described as a sectional riffle and is termed a "tailing riffle", said riffle being formed of an L-shaped base section 36 which gradually decreases in height from the feed end of the table to the opposite end and a cap section 37 substantially inverted U-shape which also gradually increases in height from the feed end toward the opposite end, said cap section fitting snugly over the vertical portion of the L-section, in order to allow the upper section to be adjusted in respect to the lower section, so as to increase or decrease the height of the obstruction in proportion to the amount of the material on the pervious surface so as to produce a pressure only against the heavier stratum of particles underlying the lighter particles, whereby said heavier particles will be subjected to impacts by the propelling movement of the table so as to force the heavier particles up the inclination of the surface against the banking bar thereof.

In order to retard the movement of the material on the surface in its movement by gravity, we provide the surface 27 thereof, with a series of riffles 38 which gradually decrease from the tailing side of the table toward the banking side thereof, these riffles being preferably formed of L-shaped pieces, gradually decreasing in height from the tailing side toward the banking side and are preferably mounted upon the supporting ribs of the pervious deck over air-retarding strips as clearly shown in Fig. 14.

The particular construction of riffles used in connection with a deck thus described, is immaterial, as the main object to be accomplished, is to provide means for retarding the movement of the heavier particles of the mass in their movement by gravity so as to allow said particles to be subjected to the propelling movement in order to force said particles against the banking bar and we do not wish to limit ourselves to any particular construction of retarding means as we have found by experimenting that various forms of riffle can be used for this purpose.

The obstruction termed the "tailing riffle" at the upper end thereof, has a height approximately twice the height of the retarding riffles and gradually decreases in height toward the lower end of the table until the same diminishes to a thin strip.

A suitable feed hopper 39 is arranged to deliver the material to be separated to the feed tray 26 from which the material is discharged onto the unobstructed surface of the table and at once begins to stratify, the propelling movement forcing the heavier particles against the stepped banking bar, the stratification being vertical to the rest of the pulp at this point, which enables an initial separation to take place so as to remove through the upper gate, the approximately heavier particles of the mass being separated; it, of course, being understood that the material is being floated by a gaseous cushioning medium and that the smaller heavier particles lie adjacent the pervious surface, while the larger particles which are more affected by the gaseous cushioning medium, arrange themselves above said smaller particles and the extremely light particles which are most affected by the gaseous cushioning medium, arrange themselves above the larger heavier particles, and as the deck is arranged on an incline from the drive end toward the banking end, and on an incline from the feed end toward the opposite end, the material at once takes a path of travel diagonal of said table according to the specific gravity of the particles thereof, the concentrates of heavier particles which are in contact with the surface, being projected or moved out from under the light particles and gradually banking themselves against the banking bar, while the lighter particles which are floated and not affected by the propelling movement of the table, gradually move by gravity in a reverse direction to that of the heavier particles.

The lighter particles which are floated on the heavier particles by the gaseous cushioning medium, gradually move by gravity in a reverse direction to that of the heavier particles as the projecting pulsations imparted to the table do not affect these particles in the same manner that the heavier particles are affected and as the tailing riffle which has been previously adjusted, has a height in proportion to the height of the zone of the heavier particles upon the surface, the heavier particles are subjected to impacts from said tailing riffle by the movement of the table so as to advance the particles toward the banking bar while the lighter particles are allowed to move by gravity in a reverse direction so as to slush over the tailing riffle onto the delivery shelf on that side of the table and are discharged into suitable product spouts.

It will be seen by this construction, that we are able to cut out the material along three sides of the table, and while in the majority of cases, the heavier particles are the particles of value in a mass of material, in some cases, the lighter particles of the mass are the ones which are desired to be collected and in that case, the operation is identical except that the heavier particles become the gangue or waste and the lighter particles become the particles of value.

In Figs. 15 and 16, we have shown other forms of table 41 and 42 which gradually decrease in width from the upper edge toward the lower edge thereof in order to decrease the separating surface, and we do not wish to limit ourselves to any particular form of table, as the main object to be accomplished is to provide a pervious surface which gradually decreases in width from the feed toward the opposite end thereof, having a banking bar along one edge and an obstruction along the other edge which act upon the concentrates in order to impart impacts to the concentrates so as to move the zone of concentrates from under the zone of tailings.

In Fig. 17, we show a slightly modified form of tailing riffle 43 in which the riffle is formed of a series of gates 44 formed of substantially rectangular frames, the side bars of which are of different widths in order to enable an obstruction to be formed which gradually decreases from the feed end of the table toward the opposite end thereof. These gates 44 are arranged in advance of a gate bar 45 spaced above the table over the delivery shelf, said bar having a metal strip 46 spaced therefrom. The gates slide between the bar 45 and the strip 46 and are held in their adjusted positions by friction and it will be seen that by shifting the gates so as to throw the side bars constituting the frames into different positions, an obstruction can be formed so as to exert a resistance against the concentrates underlying the tailings on the table.

In the operation of an apparatus as herein shown to carry out our improved process of separating and grading material, the apparatus is set in motion and material from the feed hopper is fed onto the feed shelf from which it is discharged onto the unobstructed surface of the pervious deck, the pulp immediately beginning to stratify by the action of the gaseous cushioning medium, the heavier particles being projected by the propelling movement of the table against the stepped banking block and a portion of the values beginning to bank out, the stratification at this point being vertical to the rest of the pulp and a portion of the values being cut out by the first of the banking gates into one of the product spouts.

As the pulp travels by gravity and reaches the portion of the deck having the retarding riffles, it assumes the position upon said deck as shown in Fig. 5, the heavier particles or concentrates banking against the banking bar in order to produce a back pressure upon the heavier particles of the entire bulk of the pulp on the table, in a similar manner to that disclosed in our prior Patent #1,073,644 the gates forming means for relieving the pressure at this point and for collecting the heavier particles and in Fig. 5, the line A represents the concentrate values that are cut out by one of the gates.

B represents the stratum of values or heavy particles underlying the stratum of tailings C and it will be seen that the stratum of tailings gradually increases in height from the banking side toward the tailings side of the table, while the stratum of concentrates gradually decreases in height from the banking side toward the tailings side of the table, the tailing riffle being adjusted so as to give the same height as the stratum of concentrates, in order that the same can exert a pressure upon the stratum of concentrates through the action of the table which pushing action or impact, is communicated from particle to particle, until the banking gates are reached so as to move the entire stratum of concentrates from under the stratum of tailings and as some of the gates are arranged to cut out the products, pressure is relieved at this point and the heavier particles are discharged from the apparatus into the product spouts. While this action is taking place, the tailings are subjected to the action of gravity and "slop" over the tailing side of the table.

As the pulp proceeds down the table, it becomes constantly thinner as the concentrates are being constantly cut out by the banking gates and as the tailing riffle is reduced in height in exactly the same proportion so that it will always exert its pressure on the heavier stratum lying on the pervious floor, by the time the ore pulp has reached the narrowest area of the table, the heavier stratum has practically disappeared, having been cut out through the gates into the different product spots and as the tailing riffle also decreases in height and at this point has been reduced to a feather edge, the products come off of the narrow portion of the table into the product spots, which would normally consist of what is called "middling products," which is an intermixture of both values and waste or gangue and can be returned to the feed to be retreated on the apparatus.

It will be seen by this construction, that material is taken from three sides of the table simultaneously, thereby utilizing a smaller table which requires less power in the driving thereof. The amount of power required to drive the necessary blower to furnish air is also reduced.

While in the description, we have used the terms employed in the treatment of ores and minerals, an apparatus as herein shown and described is capable of carrying out the process of separating and grading seeds and cereals of various kinds which differ in specific gravity and in some cases, when treating various kinds of material, the heavier particles become the gangue or waste while the lighter particles are those of value. In that case, the particles of value are removed from the tailings side of the table while the particles of gangue are removed from the banking side of the table.

We claim:

1. The process of separating a mass of material having different characteristics, consisting in gravitally feeding the material and supporting the same upon a transversely and longitudinally inclined surface by a gaseous cushioning medium to permit stratification thereof and to cause a progressively narrowingly stream of material to move longitudinally thereon by gravity, imparting to said mass a propelling movement across the feeding movement of the material and against the force of gravity, obstructing the heavier particles in their imparted movement and subjecting the lighter particles of said mass to the action of gravity to cause said lighter particles to move in a reversed direction to the movement of the heavier particles.

2. The process of concentrating a mass of material, parts thereof having different characteristics, consisting in gravitally feeding and supporting a progressively narrowing stream of material upon a transversely and longitudinally inclined surface by continuous air pressure to cause a gravitally longitudinally movement of said material upon said support and to permit stratification thereof, imparting to the heavier particles of said material a propelling movement in a direction across the movement of material by gravity, banking the heavier particles of said material across the line of traveling of propelling movement in their movement against the force of gravity, and subjecting the lighter particles of said material to the action of gravity to cause the lighter particles to move in a direction opposite to that of the heavier particles.

3. The process of concentrating a mass of material, parts thereof having different characteristics, consisting in feeding and supporting the material upon a pervious supporting surface inclined transversely and longitudinally by a gaseous cushioning medium to permit stratification thereof and to cause a progressively narrowing stream of material to move longitudinally thereon by gravity, imparting to said material a positive movement across the longitudinal movement by gravity to propel the heavier particles of said material transversely thereon against the force of gravity, forming an obstruction of the heavier particles across the line of propelling movement, and subjecting the lighter particles to the action of gravity to cause said particles to move transversely thereon in a reversed direction to the movement of the heavier particles.

4. The process of concentrating material having components of different characteristics, consisting in gravitally feeding and supporting a progressively narrowing stream of material upon a support by a gaseous cushioning medium to permit stratification thereof, propelling the heavier particles of material in a direction transverse to the feeding movement of material and against the force of gravity, obstructing the travel of the heavier particles of material in the propelling movement until a substantially vertical stratum of concentrates is established beyond the portion of material containing gangue and concentrates, exerting and maintaining a pressure against the underlying stratum of concentrates, subjecting the lighter particles of said material to the action of gravity to cause said particles to move in a reversed direction to the propelling movement of the heavier particles, and causing a portion of said stratum to travel at an angle to the line of movement.

5. A concentrating table having a longitudinally and transversely inclined pervious floor gradually decreasing in width from the feed end toward the opposite end thereof, for exerting and maintaining a pressure against the material thereon, means for subjecting the material to a gaseous cushioning medium to permit stratification thereof, means for gravitally feeding the material to cause the material to move longitudinally thereon, means for propelling the material in a direction across the gravitally feeding movement thereof, means for obstructing the heavier particles of said material across the line of propelling movement, and means for subjecting the lighter particles of said material to the action of gravity to cause said particles to move in a direction by gravity opposite to the propelling movement of the heavier particles of said material.

6. The process of concentrating a mass of material, parts thereof having different characteristics, consisting in gravitally feeding a progressively narrowing stream of material in one path upon a transversely and longitudinally inclined pervious support, having means for supporting the material thereon by a gaseous cushioning medium retarding the feeding movement of material by gravity, imparting to said material a positive movement transversely of the feeding movement of the material to cause said material to move against the force of gravity, obstructing the material in its imparted movement until its substantially vertical stratum of heavier particles is established, and subjecting the lighter particles of said material to the action of gravity to cause said particles to move transversely upon said support in a direction opposite to the direction of the imparted movement of the heavier particles.

7. The process of concentrating a mass of material, parts thereof having different characteristics, consisting in gravitally feeding a progressively narrowing stream of material in one path upon a transversely and longitudinally inclined pervious support, having means for supporting the material thereon by a gaseous cushioning medium retarding the feeding movement of material by gravity, imparting to said material a positive movement transversely of the feeding movement of the material to cause said material to move against the force of gravity, obstructing the material in its imparted movement until its substantially vertical stratum of heavier particles is established, subjecting the underlying stratum of heavier particles to a series of impacts, and subjecting the lighter particles of said material to the action of gravity to cause said particles to move transversely upon said support in a direction opposite to the direction of the imparted movement of the heavier particles.

8. The process of concentrating a mass of material, parts thereof having different characteristics, consisting in feeding said material by gravity in one path and supporting the material by a gaseous cushioning medium to permit stratification thereof upon a surface inclined transversely and longitudinally, imparting to said material a transverse movement across the line of movement of material by gravity and against the force of gravity, banking the material across the line of imparted movement until a substantially vertical stratum of heavier particles is established, releasing a portion of said concentrates in a line with the propelling movement, exerting and maintaining pressure against the underlying stratum of concentrates, and subjecting the lighter particles of said material to the action of gravity to cause said particles to move transversely thereon in a reversed direction to the line of imparted movement.

9. A dry concentrating table having a pervious floor gradually decreasing in width from the feed end toward the opposite end thereof, means for adjusting the inclination of said table transversely and longitudinally thereof, gravitally feeding the material to cause the material to move longitudinally thereof by gravity, means for supporting the material upon said floor by a gaseous cushioning medium to permit stratification thereof, means for propelling the material against the force of gravity and across the line of feeding movement of said material by gravity, means for exerting and maintaining pressure against the underlying stratum of material, and means for separately collecting the heavier particles and the lighter particles of said material from the opposite sides of said table.

10. The process of concentrating a mass of material, parts thereof having different characteristics, consisting in supporting material upon a surface by a gaseous cushioning medium to permit stratification thereof, gravitally feeding a progressively narrowing stream of material in one path, imparting a propelling movement to the underlying heavier particles of said mass across the gravitally feeding movement thereof and against the force of gravity to cause the lighter particles to move transversely thereon in the opposite direction to the heavier particles, and exerting and maintaining pressure against the underlying stratum of material in its movement upon said surface.

11. The process of concentrating a mass of material, parts thereof having different characteristics, consisting in gravitally feeding and supporting the material upon a transversely and longitudinally inclined pervious support to cause the material to move longitudinally thereon by gravity, supporting the material by a gaseous cushioning medium to permit stratification thereof, imparting to the heavier particles of said material by a series of impacts a positive movement across its longitudinal path of travel by gravity, forming an obstruction of concentrates beyond the strata of material, containing tailings across the imparted movement of said material to exert a back pressure against the mass of material on said surface, and obstructing the movement of the concentrates in their movement exerted by back pressure for exerting and maintaining a constant pressure thereon, and subjecting the overlying stratum of lighter particles to the action of gravity to cause said particles to move transversely of said table in a direction opposite to the propelling movement of the heavier particles.

12. The process of concentrating a mass of material, parts thereof having different characteristics, consisting in supporting the material upon a transversely and longitudinally inclined surface by a gaseous cushioning medium, feeding said material in one path to cause the material to move longitudinally thereon by gravity, simultaneously imparting to said material a positive movement in a transverse direction to the feeding of the material, obstructing the material in the imparted movement thereof until a substantially vertical stratum of concentrates is established to exert a back pressure upon the mass of material, obstructing the concentrates in their movement exerted by back pressure to exert and maintain a constant pressure against the underlying stratum of concentrates, subjecting the underlying stratum of concentrates to a series of impacts, and then causing a portion of said stratum of concentrates to travel at an angle to the line of propelling movement and then in line with such movement.

13. The process of concentrating a mass of material, parts thereof having different characteristics, consisting in gravitally feeding a progressively narrowing stream of material in one path, subjecting said material to a gaseous cushioning medium to permit stratification thereof, retarding the movement of material by gravity, imparting to said material a positive movement transversely of the feeding movement of the material by gravity, obstructing the heavier particles of said material in their imparted movement until a substantially vertical stratum of concentrates is established beyond the stratum of material containing tailings, subjecting the heavier particles of said mass to a series of impacts, gravitally causing said stratum of tailings to move transversely of the feeding movement of material and in a reversed direction to the propelling movement thereof, and then causing a portion of said stratum of concentrates to travel at an angle to the line of the imparted movement and then in line with such movement.

14. A dry concentrating table having a pervious floor, means for adjusting the inclination of said floor transversely and longitudinally thereof, means for feeding the material upon said floor to cause said material to move longitudinally thereon by gravity, means for subjecting the material to a gaseous cushioning medium to permit stratification thereof, means for propelling the material against the force of gravity and across the line of feeding movement of said material by gravity, means for obstructing the heavier particles in the line propelling movement, means for exerting and maintaining pressure against the heavier particles, means for releasing said heavier particles in line with the propelling movement, and means for separately collecting the heavier particles from the lighter particles from the opposite sides of said table.

15. A dry concentrating table having a transversely and longitudinally inclined pervious floor gradually decreasing in width from the feed end toward the opposite end thereof, means of gravitally feeding the material upon said floor to cause the material to move longitudinally thereon by gravity, means for supporting the material upon said floor by a gaseous cushioning medium to permit stratification thereof, means for reciprocating said table to cause the heavier particles of said material to move across the line of feed against the force of gravity, means for obstructing the heavier particles, means for exerting a series of impacts against said obstructed heavier particles, and means for causing the lighter particles to move transversely upon said floor by gravity in a reversed direction from the heavier particles.

16. The process of concentrating a mass of material, parts thereof having different characteristics, consisting in supporting the material upon a transversely and longitudinally inclined surface by a gaseous cushioning medium to permit stratification thereof, gravitally feeding said material to cause the material to move longitudinally thereon by gravity, propelling the heavier particles of said material across the feeding movement and against the force of gravity, obstructing the movement of said particles in their line of propelling movement, exerting and maintaining a pressure against the underlying stratum of heavier particles, subjecting the stratum of heavier particles thus obstructed to a series of impacts to cause said stratum to move out from under the stratum of lighter particles, and subjecting the overlying stratum of lighter particles to the action of gravity to cause said particles to move in a reversed direction to that of the heavier particles.

17. The process of concentrating a mass of material, parts thereof having different characteristics, consisting in gravitally feeding said material and in supporting said material upon a surface by a gaseous cushioning medium to permit stratification thereof, propelling the heavier particles upon said surface against the force of gravity and across the feeding movement of the material, exerting and maintaining pressure on the heavier particles, subjecting the zone of heavier particles to a series of impacts to cause the zone of heavier particles to move from under the zone of lighter particles and subjecting the zone of lighter particles to the action of gravity to cause said particles to move in a direction reversed to that of the heavier particles.

18. The process of concentrating a mass of material, parts thereof having different characteristics, consisting in supporting the material upon a transversely and longitudinally inclined surface by a gaseous cushioning medium to permit stratification thereof and to cause the material to move by gravity longitudinally thereon, imparting a propelling movement to the heavier particles of said mass across the longitudinal movement of material by gravity and transversely of said surface against the force of gravity, exerting and maintaining a continuous pressure against the underlying stratum of material in its movement on said surface, and subjecting the lighter particles of said mass to the action of gravity to cause said particles to move transversely on said surface in a reversed direction to the heavier particles.

19. A separating and grading apparatus, comprising a transversely and longitudinally inclined reciprocating pervious deck having means for maintaining beneath the deck a uniform upward pressure of air through the pervious floor thereof, a sectional banking bar arranged adjacent one side thereof, and an adjustable obstruction arranged adjacent the opposite side thereof.

20. A separating and grading apparatus, comprising a transversely and longitudinally inclined reciprocating pervious deck, a sectional banking bar arranged adjacent the higher side of said deck formed of a plurality of independently adjustably mounted sections, and a vertically adjustable sectional obstruction arranged along the lower side of said deck.

21. A separating and grading apparatus, comprising a pervious deck having means for maintaining beneath the deck a uniform upward pressure of air through the pervious floor thereof, means for adjusting the inclination transversely and longitudinally thereof, means for reciprocating said deck, a sectional banking bar arranged along one edge thereof, and an adjustable tailing riffle arranged along the opposite edge thereof.

22. A dry concentrating table having a pervious floor gradually decreasing in width from the feed end toward the opposite end thereof, means for maintaining beneath the floor a uniform upward pressure of air through the pervious floor thereof, means for adjusting the inclination of said table transversely and longitudinally thereof, a banking bar arranged adjacent one side of said table and an adjustable tailing riffle arranged adjacent the opposite side of said table.

23. A separating table, having a pervious deck having means for maintaining beneath said deck a uniform upward pressure of air through the pervious floor thereof, provided with a series of transversely arranged riffles, and a delivery shelf surrounding three sides thereof, a banking bar arranged along one side of said deck, and a tailing riffle arranged along the opposite side of said deck.

24. A dry concentrating table, having a pervious floor with means for maintaining beneath said floor a uniform upward pressure of air through said pervious floor, a sectional tapering tailing riffle arranged along one edge of said floor, said riffle comprising an angled base section and a cap section adjustably mounted thereon.

25. In a separating apparatus, the combination with a pervious surface having means for maintaining beneath said surface, a uniform upward pressure of air through said surface, of obstructing members arranged along the upper side of said surface, means for adjusting said obstructing members, and an adjustable obstructing member arranged adjacent the lower side of said surface.

26. A dry concentrating apparatus, comprising a pervious deck having a tailing riffle arranged along one side thereof gradually decreasing in height from the feed end toward the discharge end thereof, and means for adjusting said riffle vertically.

27. A dry concentrating apparatus, comprising a pervious deck, a bar spaced above said deck, and a series of gates adjustably mounted under said bar, said gates being substantially inverted U-shape in cross section having pads arranged between the legs thereof contacting with said surface.

28. A separating apparatus, comprising a pervious deck, gradually decreasing in width from the feed end toward the discharge end thereof, means for adjusting the inclination of said deck longitudinally and transversely thereof, a series of retarding riffles arranged upon said deck, means for feeding the material upon an unobstructed portion of said deck, means for initially banking said material, and an adjustably mounted tailing riffle arranged along one side of said deck gradually decreasing in height from the feed end toward the opposite end thereof.

29. A dry concentrating apparatus, comprising a pervious deck having a delivery shelf around three sides thereof, means for supporting material upon said deck by a gaseous cushioning medium to permit stratification thereof, means for propelling the material on said deck against the force of gravity, means for subjecting the lighter particles of said material to the action of gravity, means for collecting the heavier and lighter particles from the opposite sides of said deck, and means for collecting a mixture of heavier and lighter particles from the lower end of said table.

30. The process of concentrating a mass of material, parts thereof having different characteristics, consisting in supporting the material upon a surface by a gaseous cushioning medium to permit stratification thereof, gravitally feeding a progressively narrowing stream of material in one path, imparting a propelling movement to the heavier particles of said mass against the force of gravity, obstructing the movement of said heavier particles in their imparted movement, subjecting the zone of heavier particles to a series of impacts, and subjecting the lighter particles of said material to the action of gravity to cause said lighter particles to move in a direction opposite to that of the heavier particles.

In testimony whereof we hereunto affix our signatures in the presence of two witnesses.

HENRY M. SUTTON.
WALTER L. STEELE.
EDWIN G. STEELE.

Witnesses:
J. N. SPARKS,
A. W. SHALLCROSS.